May 15, 1962 L. T. McGEE 3,034,238
COMBINATION SCRAPER AND SCARIFIER
Filed May 27, 1957 4 Sheets-Sheet 1

INVENTOR:
Leland T. McGee

Attorneys

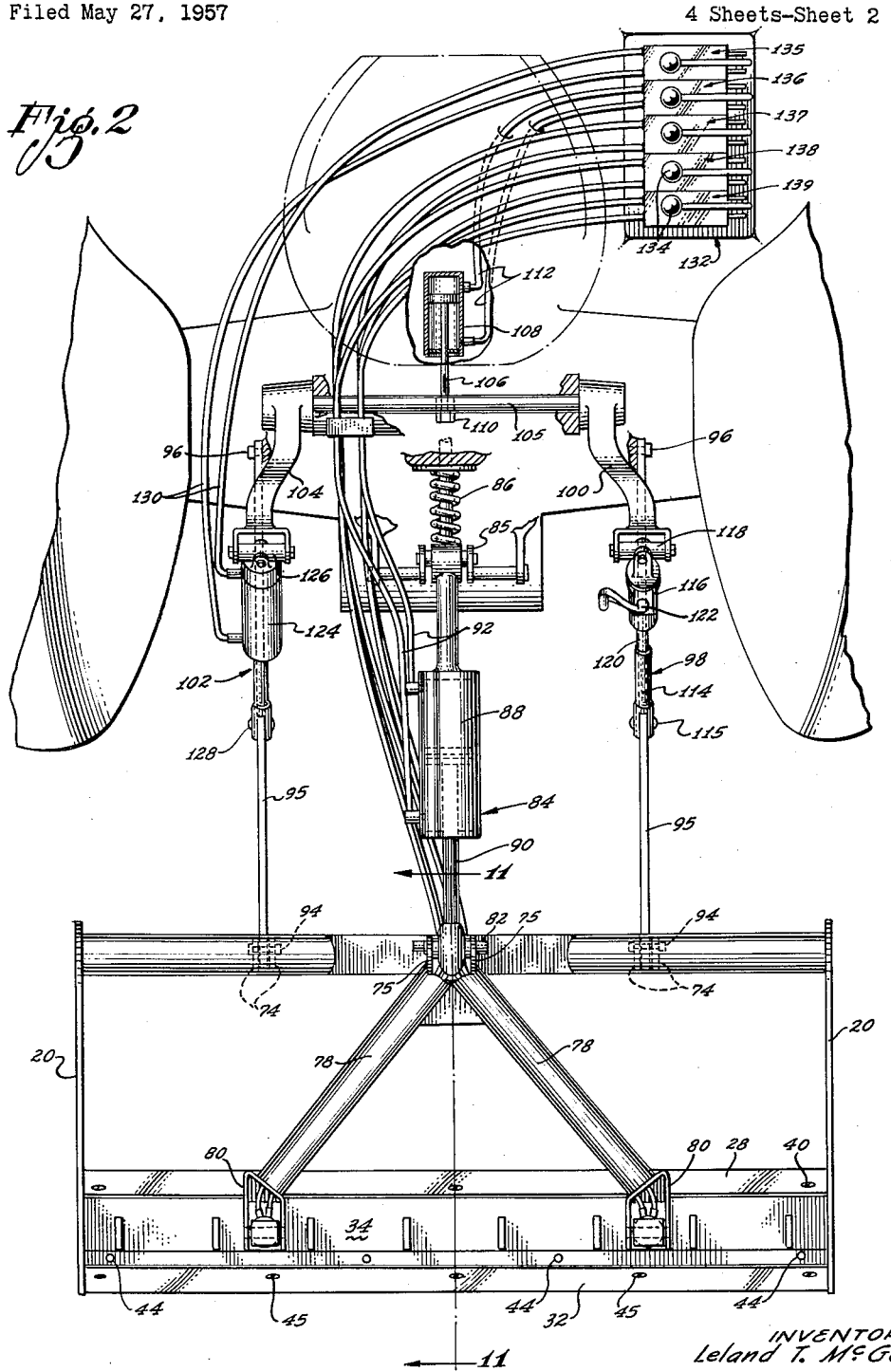

May 15, 1962 L. T. McGEE 3,034,238
COMBINATION SCRAPER AND SCARIFIER
Filed May 27, 1957 4 Sheets-Sheet 3
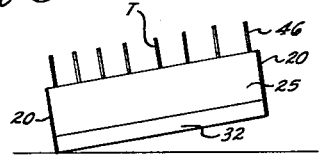
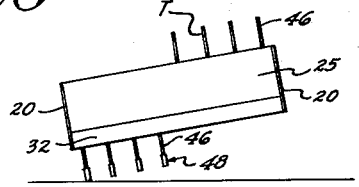
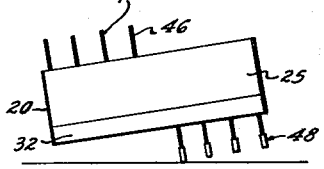
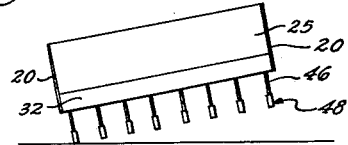
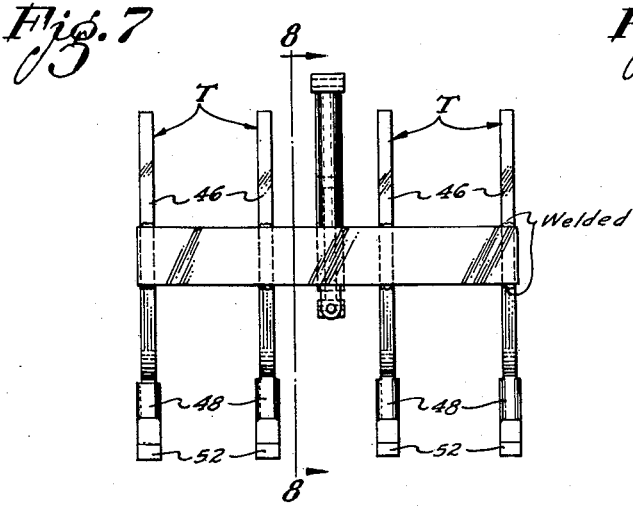
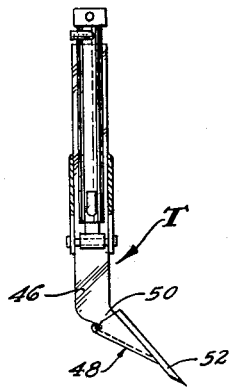
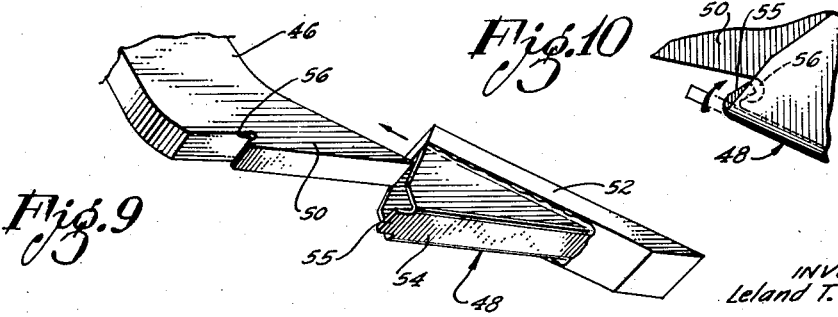
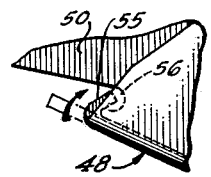
INVENTOR:
Leland T. McGee
By Smyth & Roston
Attorneys May 15, 1962 L. T. McGEE 3,034,238
COMBINATION SCRAPER AND SCARIFIER
Filed May 27, 1957 4 Sheets-Sheet 4
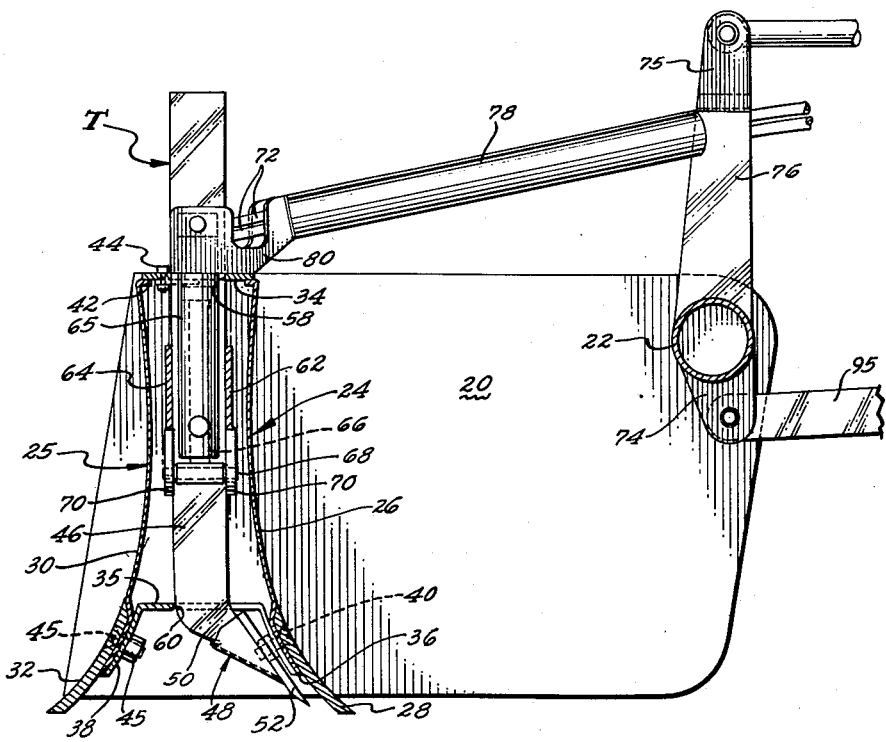
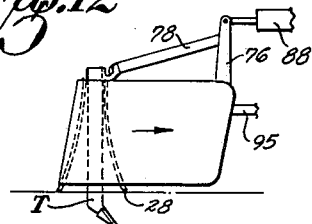
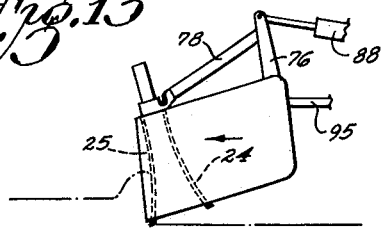
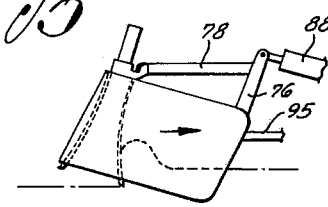
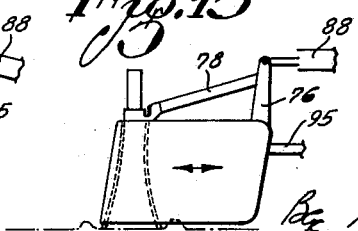
INVENTOR.
Leland T. McGee
By Smyth & Roston
Attorneys United States Patent Office 3,034,238
Patented May 15, 1962

3,034,238
COMBINATION SCRAPER AND SCARIFIER
Leland T. McGee, 410 Dixon Ave., Compton, Calif.
Filed May 27, 1957, Ser. No. 661,731
7 Claims. (Cl. 37—145)

This invention relates to the combination of a tractor and an earth-working implement hitched thereto and is particularly directed to the combination of a relatively light tractor and an implement having the general character of a scraper and scarifier.

The invention is directed primarily to the problem of attaining maximum utilization in the use of a light tractor with a scraper implement hitched thereto. Typically the scraper implement comprises a scraper bowl assembly with the tractor connected by an upper link to an upper control point of the assembly and connected by a pair of draft links to two lower points of the assembly. For raising and lowering the implement the tractor has the usual pair of remotely controlled power-actuated lift arms connected by corresponding draft links to the draft links respectively.

For maximum utilization the implement must be flexible in various respects. Thus the combination must be flexible in the sense of being adaptable to either soft ground or hard ground. Flexibility for maximum utilization is also required in the sense that the implement be adjustable to keep the work load relatively high but without exceeding the capacity of the tractor.

For maximum utilization, flexibility is further required in the sense that the implement be rapidly adjustable to meet changing conditions encountered in the travel of the implement over a work area. Thus the implement should be quickly adjustable to vary the extent of penetration into the ground or amount of earth that is moved by scraper action so that the work load may be kept within due bounds. The implement must also be quickly adjustable during transit to compensate for changes in the attitude of the traveling tractor relative to the desired plane of the finished ground surface. In addition where it is necessary to tilt the implement laterally relative to the tractor for a desired earth-moving effect in traversing the ground in one direction, it is essential that the tilt be quickly reversible to permit the implement to return immediately over the same path with the same earth-moving effect.

The invention provides flexibility in these different respects by means of a number of special provisions which work together in various ways to meet various situations that arise.

One provision is incorporation in the scraper construction of scarifier teeth that are adjustable by remote control for retractable extension into the ground below the scraper. A feature of the preferred practice of the invention in this regard is a row of scarifier teeth across the width of the scraper with the row divided into two groups, each group comprising a unitary gang of teeth under remote control. Either of the two gangs of teeth may be extended downwardly independently of the other gang to any selected depth over a liberal range of depths.

Another provision is remotely controlled power means for close adjustment of the effective length of the upper link that connects the tractor to the upper point of the implement whereby the operator may rock the implement forward and backward to vary the angle of the earth-digging teeth and to vary the earth-moving effect of the scraper bowl. A further provision is additional remotely controlled power means to vary the effective length of one of the lift links that connects one of the power-actuated arms with one of the two drawbar links. By virtue of this last arrangement the operator may quickly shorten or lengthen the controlled lift link to tilt the implement to either side.

The provision of two independent remotely controlled gangs of earth-digging teeth together with the provision for quick-acting remotely controlled means to rock the implement either longitudinally or laterally results in exceptional flexibility with respect to the control of the work load that is imposed on the tractor by the implement. Thus the angle at which the teeth enter the ground may be varied and the depth to which the the teeth are extended into the ground may be varied. If the traction load imposed by the whole row of teeth is excessive, it is a simple matter to retract one of the two gangs. If it is desirable to reduce the traction load still further or if it is desirable to narrow the earth-digging effect to less than the width of one gang of teeth, the implement may be tilted laterally to incline the extended gang of teeth so that only one end tooth penetrates the soil to any substantial depth.

The implement itself is constructed in a manner to achieve inherent strength and at the same time to provide for mounting the row of retractable teeth in an efficient manner. In this regard a feature of the invention is the provision of two spaced oppositely facing scraper means to interconnect the rear portions of two bowl ends to form a unitary scraper bowl. One advantage of this arrangement is that the scraper action may be carried out in both directions of travel of the implement. Another advantage is that the two transverse scraper means provide a box-like structure which interconnects the two bowl ends in a rigid manner to give the scraper bowl strength and durability.

A further advantage is that this box-like structure that rigidly interconnects the two bowl ends provides a transverse compartment in which the row of retractable teeth may be mounted. A still further advantage of the arrangement is that this arrangement locates the row of teeth across the trailing portion of the scraper bowl instead of across the leading portion and thus completely eliminates the possibility of the digger teeth accidentally puncturing the tractor tires.

The various features and advantages of the invention will be apparent from the following detailed description considered with the accompanying drawings.

In the drawings, which are to be regarded as merely illustrative:

FIGURE 2 is a plan view of the implement;

FIGURE 3 is a simplified diagrammatic view showing how the scraper bowl may be tilted laterally with all of the teeth retracted;

FIGURE 4 is a similar view with only the gang of teeth extended on the side to which the scraper bowl is tilted;

FIGURE 5 is a similar view with only the gang extended that is on the upper side of the tilted scraper bowl;

FIGURE 6 is a similar view with both gangs of teeth extended;

FIGURE 7 is a front elevational view of one of the gangs of teeth together with a power cylinder for extending and retracting the gang of teeth;

FIGURE 8 is a transverse section taken as indicated by the line 8—8 of FIGURE 7 and showing how the power cylinder is connected to the gang of teeth;

FIGURE 9 is a perspective view on an enlarged scale showing how a replaceable point may be mounted on a tooth shank;

FIGURE 10 is a fragmentary elevational view showing how a flexible tongue of the replaceable point may be bent into retaining engagement with the tooth shank;

FIGURE 11 is a sectional view of the scraper bowl taken as indicated by the line 11—11 of FIGURE 2;

FIGURE 12 is a simplified side elevational view showing how the scraper bowl may be moved forward with the teeth extended into the ground;

FIGURE 13 shows how the scraper bowl may be moved backward in rearwardly inclined position for a back filling scraper action;

FIGURE 14 is a similiar view showing how the scraper may be moved forward in a forwardly inclined position for scraper action; and FIGURE 15 is a similar view showing how, with all the teeth retracted, the scraper bowl may be moved forward and rearward for leveling action on the earth.

Figure 1:
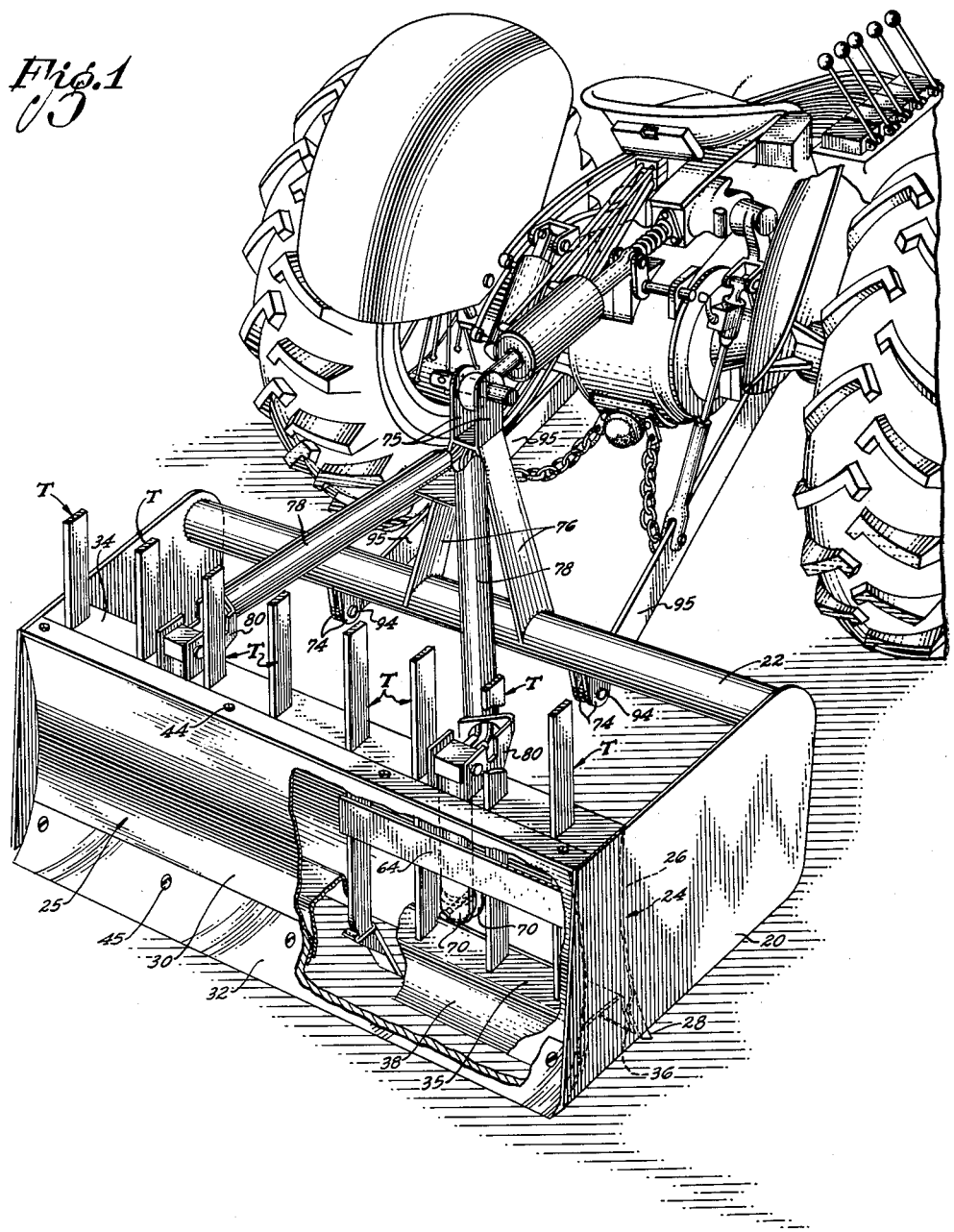
FIGURE 1 is a perspective view, with parts broken away, showing the presently preferred embodiment of the invention in combination with a light tractor of a well known type.

FIGURES 1 and 2 show the implement or scraper assembly of the present embodiment of the invention hitched to a light tractor of a well known type. As shown in these two views and further shown in FIGURE 11, the implement construction includes two bowl ends 20 in the form of heavy metal plates which are interconnected at their forward ends by a transverse tubular beam 22 and are interconnected at their rear ends by a scraper structure that includes a forwardly concave scraper means 24 and a rearwardly concave scraper means 25. The forward scraper means 24 comprises the usual mold board 26 with a detachable scraper blade 28 along its lower edge and, in like manner, the scraper means 25 comprises a mold board 30 with a detachable scraper blade 32 along its lower edge.

The space between the two mold boards 26 and 30 is spanned by a transverse top plate 34 and is spanned again by a lower transverse plate 35. This lower plate 35 is formed with a forward flange 36 contiguous to the curvature of the forward mold board 26 and a rearward flange 38 conforming to the rear mold board 30. Thus the scraper structure that comprises the two bowl ends 20, the two mold boards 26 and 30 together with the transverse top plate 34 and the lower transverse plate 35 forms a relatively narrow box-like transverse housing or compartment for the retractable earth-digging teeth of the implement. With the top plate 34 and the lower plate 35 both united with the forward mold board 26 and with both of these plates and the mold board welded to the two bowl ends 20, the two bowl ends are rigidly interconnected. The forward tubular beam 22 is also welded to the two bowl ends and the result is a scraper bowl of exceptional strength and durability.

The forward scraper blade 28 is detachably mounted on the forward mold board 26 by suitable bolts 40 (FIGURE 11) that extend through the forward flange 36 of the lower transverse plate 35. The rear mold board 30 is mounted in a detachable manner to permit access to the interior of the scraper housing and for this purpose is formed with a flange at its upper edge for connection with the transverse top plate 34 by suitable bolts 44. The bottom edge of the rear mold board 30 and the detachable rear scraper blade 32 are releasably secured by bolts 45 to the rearward flange 38 of the lower transverse plate 35.

As best shown in FIGURE 1, a row of earth-digging teeth, each generally designated by the letter T, is mounted in the scraper housing that is formed by the two scraper means 24 and 25 in combination with the top plate 34 and the lower plate 35. As shown in FIGURES 7 to 10, inclusive, each tooth T comprises a shank member 46 and a replaceable point member 48. The shank member 46, which may be made of flat bar stock, has a tapered lower end portion 50 that extends forwardly and downwardly. The point member 48 is in the form of a hollow tapered shoe that is open at its larger end to fit telescopically over the tapered end portion 50 of the shank member.

As best shown in FIGURE 9, the point member shoe may comprise a tooth element 52 of a suitable steel alloy and a metal plate 54 that is bent to form three sides of the shoe and is welded to the tooth element 52. The metal plate 54 is formed wtih a tongue 55 which may be bent as shown in FIGURE 10 for retaining engagement with a transverse recess 56 in the shank member 46. The metal plate 54 may be made of relatively thin mild steel to provide the desired pliability for the tongue 54.

The shank members 46 of the retractable earth-digging teeth T are slidingly mounted in guide slots 58 in the top transverse plate 34 and guide slots 60 in the lower transverse plate 35. The lower transverse plate 35 is spaced a sufficient distance above the bottom of the scraper bowl, with special reference to the bottom edges of the scraper blades 28 and 32, to provide adequate space for complete retraction of the tooth elements 52 into inoperative positions. FIGURE 11 shows the position of a completely retracted tooth.

The row of earth-digging teeth T may be controlled in any suitable manner. In the present embodiment of the invention there are eight teeth in the row and the teeth are divided into two gangs or units of four teeth each, there being a gang of four teeth on each side of the longitudinal center line of the implement. As shown in FIGURES 7 and 11, the four teeth of each gang of teeth may be interconnected by a forward transverse bar 62 and a rearward transverse bar 64, the two bars being rigidly welded to the shank members 46 of the four teeth.

The means for remotely controlling each of the two gangs of teeth may comprise a power cylinder 65 that extends through and is fixedly mounted in the transverse top plate 34. The usual piston in the power cylinder is connected by a piston rod 66 with a cross pin 68 that engages a pair of apertured ears 70, the two ears being integral with the two transverse bars 62 and 64 of the gang of teeth. A pair of flexible conduits 72 (FIGURE 11) are connected to opposite end ports of the power cylinder 65 in a well known manner for hydraulic extension and contraction of the earth-digging teeth.

As heretofore stated, the described implement has two laterally spaced lower points for connection to the tractor and a third central upper point. The two lower connection points may be provided by two pairs of downwardly extending ears 74 that are rigidly mounted on the transverse tubular 22 as best shown in FIGURE 11. The third upper connection point may be provided by a pair of upwardly extending ears 75 on the upper end of what may be termed an A frame. In the construction shown, this frame has a pair of forward divergent legs 76 united with the transverse tubular beam 22 and a rearward pair of divergent legs 78 that are connected by brackets 80 with the upper exposed ends of the two power cylinders 65. The two rearward legs 78 are tubular to house the previously mentioned flexible hydraulic conduits 72 for the two power cylinders 65.

The pair of ears 75 at the top of the A frame are connected by a cross pin 82 and a ball joint thereon (not shown) to the rear end of an upper link that is generally designated by the numeral 84. The forward end of this upper link 84 is suitably connected to the tractor. In the construction shown, the forward end of the upper link 84 is connected by a ball joint to a pivoted yoke 85 which backs against a compression spring 86.

In accord with the teaching of the invention, this upper link 84 is adapted for power-actuated extension and contraction under remote control. For this purpose the forward portion of the upper link 84 includes a power cylinder 88 and the rearwardly extending piston rod 90 of the power cylinder constitutes the rearward end portion of the link. In a well known manner, a pair of flexible hydraulic conduits 92 are connected to opposite end ports of the power cylinder 88.

Each of the two lower pairs of ears 74 is connected by a cross pin 94 and a ball joint thereon (not shown) with the rear end of a corresponding drawbar link 90 and the forward ends of the two drawbar links are connected by ball joints (not shown) to corresponding studs 96 on the housing of the tractor. The right drawbar link 95 is connected by a lift link, generally designated 98, to a right lift arm 100 on the tractor. In like manner, the left draw bar link 95 is connected by a lift link, generally designated 102 to the left lift arm 104 of the tractor.

In a well known manner, the two lift arms 100 and 104 are fixedly mounted on a cross shaft 105 on the tractor. A piston rod 106 of a power cylinder 108 is operatively connected to a rocker arm 110 on the cross shaft 105 to raise and lower the two lift arms 100 and 104 in unison by remote control. The power cylinder 108 is controlled by a pair of hydraulic conduits 112.

Preferably the right lift link 98 is manually adjustable in length for adjustment of the right draw bar link 95 to raise or lower the right side of the scraper bowl assembly. For this purpose the lower end of the lift link 98 may comprise an internally threaded tubular member 114 that is connected to the right drawbar link 95 by a pivot pin 115. The upper end of the lift link 98 comprises a cylindrical casing 116 that is connected to the lift arm 100 by a universal joint 118. Rotatably mounted in the cylindrical casing 116 is a screw 120 that is threaded into the tubular member 114 and is controlled by a manually operable crank 122. The crank 122 rotates the screw 120 by means of a worm gear to lengthen or shorten the lift link 98.

In accord with the teaching of the invention, the left lift link 102 comprises a power cylinder 124 and a piston rod 125 extending downward therefrom, the power cylinder being connected to the left lift arm 104 by a universal joint 126 and the piston rod being connected to the left drawbar link 95 by a pivot pin 128. A pair of flexible hydraulic conduits 130 are connected to the opposite ends of the power cylinder 124.

For centralized control, the five power cylinders of the described apparatus may be connected to a valve assembly 132 comprising a row of 4-way valves having individual control handles 134 within convenient reach of the operator on the tractor. The valves may be arranged in any convenient order. In this instance the first valve 135 of the row is connected to the pair of conduits 130 to vary the length of the left lift link 102; the second valve 136 is connected to the conduits 112 for control of the power cylinder 108 that raises and lowers the two lift arms 100 and 104; the third valve 137 is connected to the conduits 92 for operation of the power cylinder 88 to extend and contract the upper central link 84 for rocking the scraper bowl forward and rearward; the fourth valve 138 is connected to one pair of the conduits 72 for operating the power cylinder 65 that raises and lowers the left gang of earth-digging teeth T; and, finally, the fifth valve 139 is connected to the second pair of conduits 72 for control of the power cylinder that raises and lowers the right gang of teeth. The five valves are connected in a well known manner to a suitable source of pressurized hydraulic fluid.

The manner in which the described apparatus operates to serve its purpose may be readily understood from the foregoing description. It is apparent that the valve 135 may be manipulated to raise and lower the left drawbar link 95 for tilting the scraper bowl laterally towards either side and that the valve 137 may be manipulated to tilt the scraper bowl forward and rearward. The scraper bowl may be raised or lowered without change in either its lateral tilt or its longitudinal tilt by manipulation of the valve 136. The two gangs of earth-digging teeth T may be extended downward or retracted independently of each other by manipulation of the two valves 138 and 139.

FIGURE 12 shows the scraper bowl in horizontal position with all of the teeth T extended downward to the maximum to loosen the ground under the scraper bowl. At the same time that the teeth T are loosening the soil, the forward scraper blade 28 is diverting soil into the scraper bowl.

FIGURE 13 shows how the rearwardly facing scraper means 25 may be employed with the scraper bowl traveling backward to push the loose earth backwards, for example, in a backfilling operation. FIGURE 14 shows how the scraper bowl may be moved forward in a forwardly rocked position to pick up loose earth to a substantial depth. FIGURE 15 shows how the scraper bowl may be positioned horizontally with the earth-digging teeth completely retracted to permit the scraper bowl to be moved forward and backward for leveling the loose earth.

FIGURE 3 shows how the scraper bowl may be tilted laterally relative to the tractor to level the earth with respect to a plane that is tilted relative to the tractor. FIGURE 4 shows how only the left gang of teeth T may be extended downward from the laterally tilted scraper bowl and FIGURE 5 shows how only the right hand gang may be extended downward if desired. FIGURE 6 shows both gangs of teeth extended downward from the tilted scraper bowl.

If the earth is relatively loose, all of the earth-digging teeth may be extended to their full extent for maximum loosening effect without overloading the tractor. The load on the tractor caused by penetration of the teeth T into the soil may be varied to a certain degree by changing the angle of the teeth elements 52 with respect to the surface of the ground and, of course, this angle may be changed by manipulating the valve 137 to tilt the scraper bowl forward or rearward.

If the extension of all of the teeth T places too much of a load on the tractor, only one of the two gangs of teeth may be extended downward to penetrate the soil. It is apparent also that only one gang of teeth will be used where it is desired to loosen a relatively narrow strip of earth. FIGURES 4 and 5 show how either of the two gangs may be extended downward with the other gang of teeth completely retracted. Since the scraper bowl is tilted laterally in FIGURES 4, 5 and 6, only the end tooth of the row of extended teeth penetrates the soil to the maximum.

My description in specific detail of the presently preferred embodiment of the invention will suggest various changes, substitutions and other departures from my disclosure within the spirit and scope of the appended claims.

I claim:

1. An earth-working assembly to be hitched to a tractor with means on the tractor to vary the position of the assembly relative to the tractor including means to tilt the assembly laterally relative to the direction of travel of the tractor, said assembly comprising: a forwardly open scraper bowl having forwardly extending side walls and having a forwardly facing transverse scraper means across its rear; a transverse row of downwardly and forwardly pointing earth-digging teeth adjacent the rear of said transverse scraper means, a plurality of said teeth being interconnected to form a unitary gang of teeth at one end of the row, a plurality of said teeth being interconnected to form a unitary gang of teeth at the other end of the row; and two remotely controlled power means carried by said scraper bowl for raising and lowering said two gangs independently whereby with only one of the gangs of the teeth lowered below the scraper bowl, the scraper bowl may be tilted laterally to cause an end tooth of the lowered gang to extend further downward than the remaining teeth in the row of teeth.

2. An earth-working assembly to be hitched to a tractor with means on the tractor to vary the position of the assembly relative to the tractor, said assembly comprising: a first forward mold board with a forwardly concave scraper element thereon; a second rearward mold board with a rearwardly concave scraper element thereon; a pair of bowl ends rigidly connected to and extending forward from the opposite ends of said two mold boards and forming therewith a forwardly open scraper bowl; an upper transverse plate and a lower transverse plate spanning said space and rigidly connected to said bowl ends and to at least one of said mold boards to form therewith a box-like housing to give strength to said forwardly open scraper bowl; a transverse row of earth-digging teeth mounted in said housing, said teeth having upwardly extending shanks in guiding engagement with both of said transverse plates; and remotely controlled power means carried by said housing and operatively connected with said shanks to extend the teeth retractably downward below the level of the bowl.

3. A combination as set forth in claim 2 in which said power means is mounted on one of said transverse plates.

4. A combination as set forth in claim 2 in which said lower transverse plate is located a sufficient distance above the bottom of the scraper bowl to provide space below the lower transverse plate for complete retraction of the teeth above the level of the bottom of said scraper bowl.

5. A combination as set forth in claim 2 in which said row of teeth comprises at least two gangs of interconnected teeth and said power means comprises two power means for independent control of said two gangs.

6. An earth-working assembly to be hitched to a tractor with means on the tractor to vary the position of the assembly relative to the tractor, said assembly comprising: a pair of forwardly extending bowl ends; a pair of transverse concave scraper means spaced apart and positioned with their backs toward each other, said pair of scraper means spanning the space between said bowl ends adjacent the rear portions of the bowl ends; transverse means rigidly interconnecting said pair of scraper means to constitute therewith a rigid box-like housing, said box-like housing rigidly interconnecting said bowl ends to form therewith a forwardly open scraper bowl; and a plurality of earth-digging teeth mounted in said box-like housing with shanks extending upward in guiding engagement with said transverse interconnecting means, said teeth being retractably extensible below the level of said pair of scraper means.

7. In a combination of a tractor and a scraper bowl assembly wherein the scraper bowl assembly has a forwardly facing scraper means and wherein the tractor is connected by an upper central link with an upper point of the assembly and is connected by a pair of drawbar links with a pair of lower points of the assembly and a pair of lift arms on the tractor is connected with the drawbar links by lift links to raise and lower the assembly, the improvement which comprises: a row of forwardly and downwardly pointing digger teeth positioned rearwardly of said forwardly facing scraper means, said teeth being divided into at least two gangs; remotely controlled power means on the assembly to lower and raise said gangs of teeth independently of each other and independently of the scraper bowl; and remotely controlled power means to vary the effective length of one of said lift links thereby to tilt the assembly laterally with corresponding tilting of said row of teeth to concentrate the weight of the assembly on the outermost tooth in the row to cause deep penetration thereby.

References Cited in the file of this patent
UNITED STATES PATENTS

| | | |
|---|---|---|
| 2,042,196 | Senz | May 26, 1936 |
| 2,238,081 | Soberanes | Apr. 15, 1941 |
| 2,698,492 | Justice | Jan. 4, 1955 |
| 2,729,902 | Launder | Jan. 10, 1956 |
| 2,749,825 | Hirasuna | June 12, 1956 |
| 2,817,168 | Mullin | Dec. 24, 1957 |
| 2,827,717 | Duke et al. | Mar. 25, 1958 |
| 2,840,935 | Bird et al. | July 1, 1958 |

FOREIGN PATENTS

| | | |
|---|---|---|
| 1,092,775 | France | Nov. 10, 1954 |
| 766,031 | Great Britain | Jan. 16, 1957 |